Figure 1:
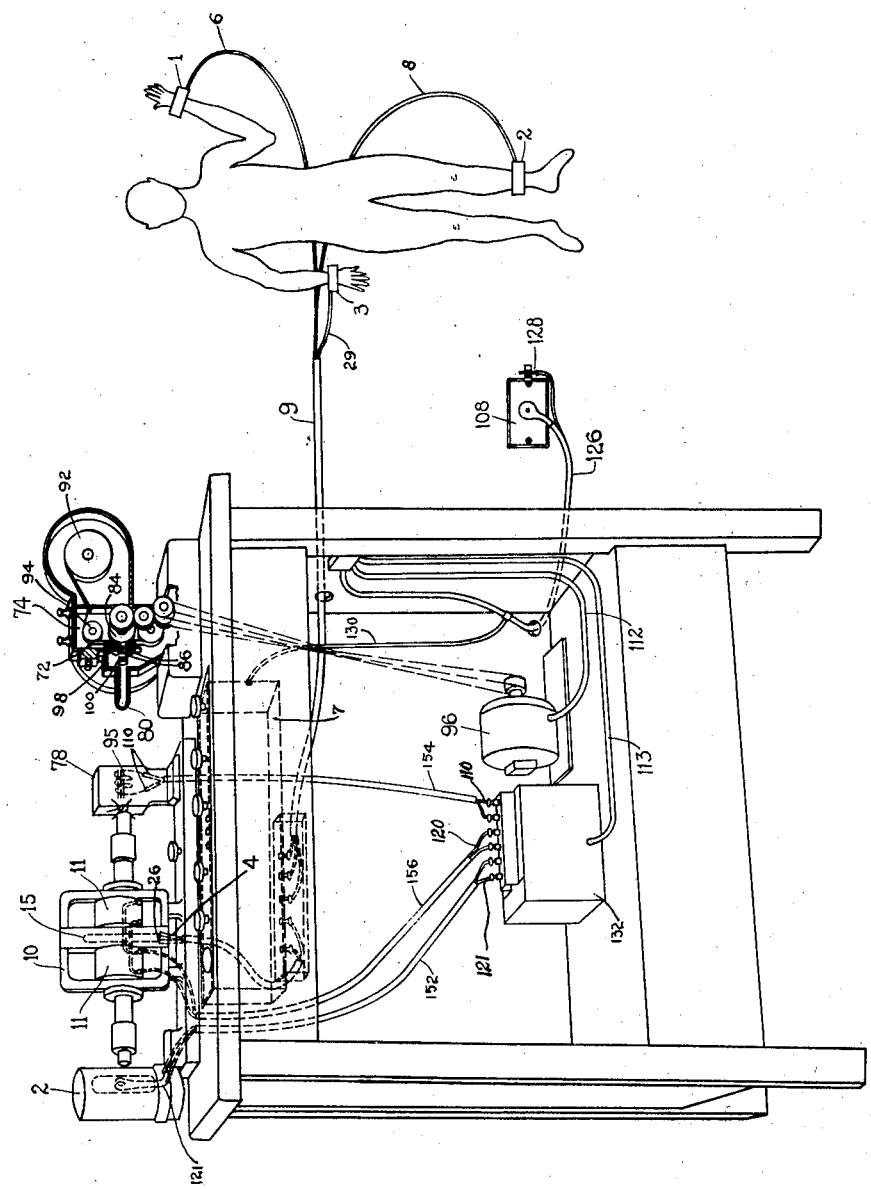

Oct. 11, 1932.　　　R. H. KRUSE　　　1,882,402
ELECTROCARDIOGRAPH
Filed Dec. 15, 1931　　2 Sheets-Sheet 1

INVENTOR
R. H. KRUSE.
BY David Rivies
ATTORNEY

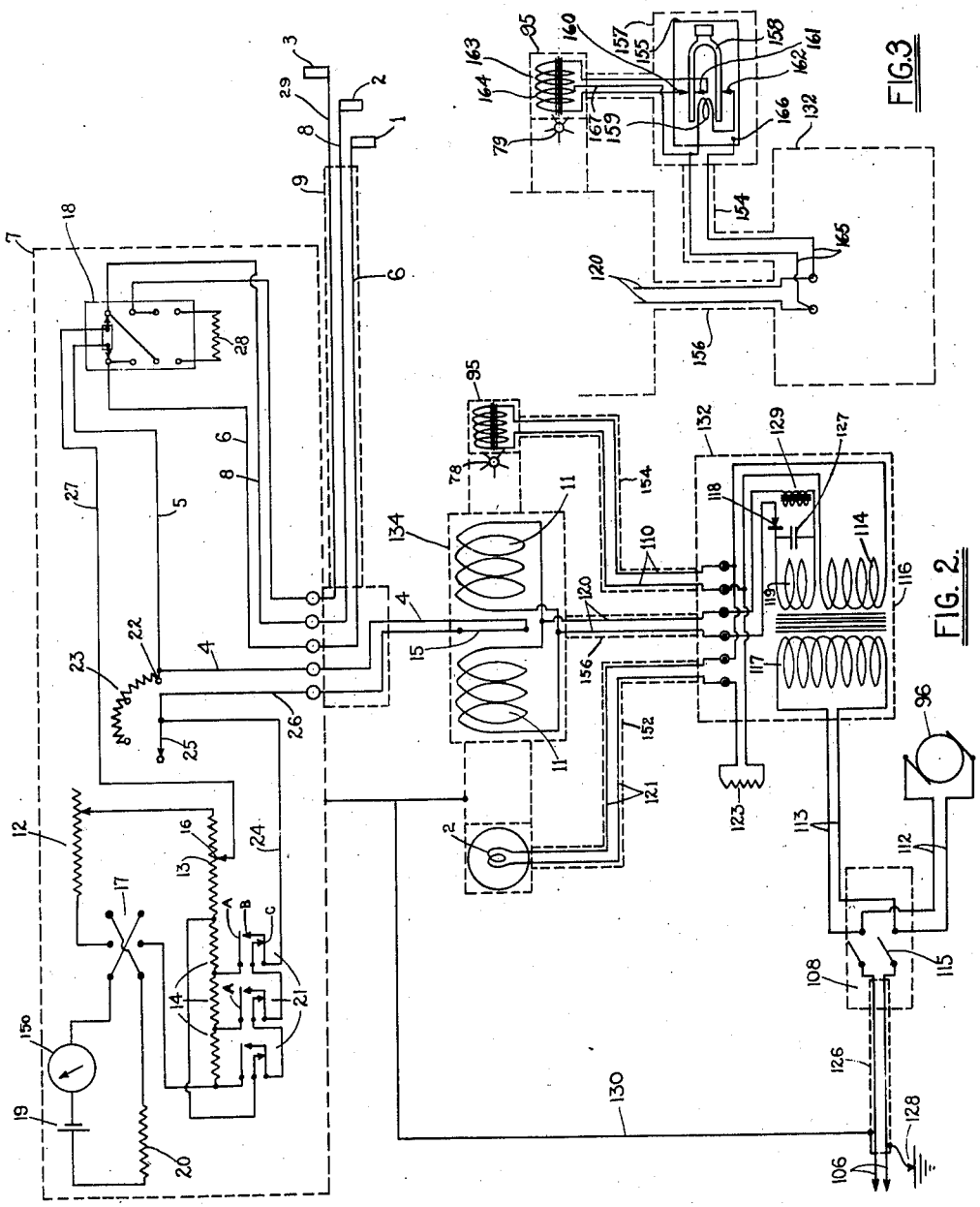

Patented Oct. 11, 1932

1,882,402

UNITED STATES PATENT OFFICE

RALPH HENRY KRUSE, OF PELHAM MANOR, NEW YORK, ASSIGNOR TO THE CAMBRIDGE INSTRUMENT COMPANY, INC., OF OSSINING, NEW YORK, A CORPORATION OF NEW YORK

ELECTROCARDIOGRAPH

Application filed December 15, 1931. Serial No. 581,154.

The present invention relates to electrocardiographs, and though certain features of the invention find applicability in electrocardiographs of other types, the invention is more particularly related to string-galvanometer electrocardiographs.

String-galvanometer instruments of the above-described character are provided with a string galvanometer, a lamp, a time-marker motor, and a camera motor, all of which must be supplied with energy. Expensive storage batteries such as are capable of supplying all this required energy are necessarily heavy and require continuous care to keep in usable condition. Even in the case of non-portable instruments, there are further vital defects, as presently to be explained; but the fact that storage batteries of reasonable bulk and weight can not, ordinarily, furnish sufficient power for an appreciable length of time is a serious objection to the use of portable electrocardiographs that the physician must carry with him to the bedside of the patient. Smaller batteries have been used, but with corresponding loss of accuracy of the measurements caused, in part, by the running down of the battery, resulting in the supply of insufficient current to the field coils of the galvanometer. Unless the measurements are made under the same voltage conditions, sources of inaccuracy are inevitably introduced. The degree of accuracy of the instrument records, indeed, depends upon the state of charge of the battery. The same sources of inaccuracy are attendant upon the use of the heavier storage-battery instruments, for they, too, become unreliable when the battery begins to run down. An unreliable measurement, in work of this kind, may be worse than no measurements at all, since a wrong diagnosis may result from a measurement that is inaccurate.

An object of the present invention, therefore, is to improve upon the design of electrocardiographs, to the ends that their efficiency and accuracy may be improved, their portability enhanced, their cost reduced, their maintenance requirements decreased and their manipulation made more easy and simple, and their wider use, therefore, encouraged.

A further object is to provide an electrocardiograph that may be operated easily and conveniently from ordinary, convenient sources of alternating current, thus also assuring constancy of voltage and sufficient power for all measurements at all times, with consequent accuracy and reliability.

It is found, however, that the use of rectifiers for rectifying the alternating current introduces stray fields which, though not objectionable for use with other instruments, seriously affects the accuracy of electrocardiographs. The electrocardiograph disclosed in the present application, furthermore, comprises two main, entirely unrelated and separate circuits, a very sensitive circuit, taking current from the patient, and a power circuit that supplies energy to the galvanometer electromagnet windings, the light source and the recording-camera motor. It has, prior to the present invention, been found impossible to supply energy to the power circuit, because the slightest disturbance of the alternating-current source has been picked up by the sensitive circuit and vitiated the measurements.

It is, therefore, another and a further object of the present invention to improve upon the construction and design of electrocardiographs, with the end in view of attaining unimpaired accuracy, even though the current is supplied from an alternating-current source and rectified.

Other and further objects will be explained hereinafter, and will be particularly pointed out in the appended claims.

The invention will now be explained in connection with the accompanying drawings in which Fig. 1 is a perspective of an electrocardiograph arranged and constructed according to a preferred embodiment of the present invention, showing electrodes thereof applied to a patient; Fig. 2 is a circuit diagram thereof; and Fig. 3 is a similar diagram of a modification.

Electrocardiographs are used to measure and record the voltages present between certain body extremities of the human or the animal body caused by the body currents that control the muscular action of the heart. In the case of the human body, it is customary to measure, in succession, the following potentials: between electrodes 1 and 3 respectively attached to the left and the right arms; between electrodes 3 and 2 respectively attached to the right arm and the left leg; and between electrodes 1 and 2 respectively attached to the left arm and the left leg. These pairs of electrodes 1 and 3, 3 and 2, and 1 and 2 are connected, in turn, through a switch 18, to a string galvanometer 10, by means of which it is thus possible to measure the potentials across the corresponding body extremities. These potentials are constantly varying, the period or cycle of variation being the same as the pulse rate. The varying potentials to which the string galvanometer 10 is thus subjected cause the string member 15 to move transversely. The image or shadow of the string member 15, greatly magnified, is projected through an exposure opening 80 and a lens 100 upon a light-sensitized film 72 in a photographic-recording camera 74. The film 72 is fed through the camera 74 from a film-reel 92, over a guide roll 94, by a feed drum 84 and cooperating feed rollers 86. The feed drum 84 is continuously driven by a motor 96 and feeds the sensitized film 72 only when the latter is pressed against the drum 84 by the feed rollers 86. In order to move the feed rollers 86 toward and from the drum, they are mounted upon a hinged frame 98.

A suitable, light-interrupting time marker 78, driven by a motor 95, is interposed between the galvanometer 10 and the camera 74. The motor 95 may be connected to the alternating current means, either more directly in the manner illustrated in Figs. 1 and 2 and described hereinafter, or less directly to the interrupted current provided by a tuning fork 158, Fig. 3.

Current is taken from a pair of electrodes, say the electrodes 1 and 2, and is passed by patient leads or conductors, as 6 and 8, through a braided, metal sheath 9, to a wiring and control mechanism in the control or resistance box 7. From the control box 7, the current travels to an electroconductive string member 15 that is suspended in the restricted air gap between two slightly spaced pole pieces of the string galvanometer 10, the energizing field-magnet windings or coils of which are shown at 11. The iron of the pole pieces is magnetically saturated. The electroconductive string member 15 is disposed at the focus of a beam of rays that proceed from a lamp or other source of light 2.

Electrocardiographs of the type illustrated and described herein are extremely sensitive, as the measurements obtained thereby depend for their accuracy upon exceedingly slight, sidewise movement of the electroconductive string member 15, in response to exceedingly weak changes in the strength of the current flowing in the string member.

The string-member circuit may be traced as follows: from one end of the string member 15, by way of a conductor 4, to a terminal contact member 22 of a shunting rheostat 23, the function of which will be explained hereinafter; thence, by way of a conductor 5, to the switch 18; thence, by way of the conductor 6, through the sheath 9, to the electrode 1; from the electrode 2, by way of a conductor 8, in reverse direction through the sheath 9, back to the switch 18; and thence by way of a conductor 27, to series-connected resistors 13 and 14. The circuit continues, by way of a conductor 24, to the normally open contact arm 25 of the rheostat 23, and by way of a conductor 26, back to the other end of the string member 15.

The resistor 13 may be a rheostat, with a variable contact 16 from the conductor 27. The resistance of the rheostat 13 is, in effect, fixed, as far as the potentiometer circuit is concerned, but serves to give variable potentials (as the contact 16 is moved) on the galvanometer. The resistor 14 consists, as illustrated, of three resistor coils of fixed resistance connected in series with each other and with the rheostat 13, and that are adapted to be connected in succession by testing switches 21, so as to give various known voltages, such as steps of one millivolt each, across the string member 15. The switches 21, in effect, transfer the two ends of the string member 15 to a certain section of the resistor 14, through which a known electromotive force drop is maintained. Because of the high resistance of the string member 15, there is no appreciable short-circuiting effect of the various parts of the resistor 14 when the above-described connection is made by the successive switches 21. There is therefore no appreciable voltage change in the resistor 14 when the switches 21 are successively operated.

The resistor coils of the resistor 14, the testing switches 21 therefor, and the resistor 13 are contained in the control or resistance box 7, along with the wiring and other control mechanism for controlling the sensitive currents of the electrocardiograph. This control mechanism is designed to fulfill three functions, each brought about by a suitable adjustment.

The sensitivity of the string galvanometer depends upon the tension of the string member 15 and this tension is required to be adjusted frequently. The first of the three functions, therefore, is to provide a convenient means for setting or standardizing the string sensitivity. A sensitive, standardizing circuit is supplied, with known voltages, which may be used as a guide for tightening the string member 15 to the degree necessary to give the desired sensitivity of string deflection corresponding to the known voltage. The adjustment may be such as to give a galvanometer sensitivity of one centimeter movement per millivolt at the point 72 of recording.

Secondly, the control box 7 contains the switch 18 for disconnecting the string member 15 from the standardizing circuit, and for connecting it rapidly in succession to the patient leads 9 and to the pairs of electrodes 1 and 3, 3 and 2, and 1 and 2, in the order of succession above described.

When two of the electrodes 1, 2 and 3 are connected to two points of a patient's body, there is usually present between the two points, in addition to the pulsating electromotive force due to the heart currents, an electromotive force of from five to twenty millivolts, known as the "skin-current" electromotive force. These skin currents are usually fixed in potential, at least for the period of a given test, but may vary with different patients.

The third adjustment is made to annul or eliminate or neutralize the potential of the patient's skin current from the electrocardiograph measurements. The electromotive force due to the patient's pulsating heart current, caused by the electrical impulses from the heart muscles during each beat of the heart, will alone be recorded. This is effected by applying an equal and opposite electromotive force, just balancing the skin-current electromotive force.

These three functions may be carried out, using the potentiometer circuit and switches under the control of the control box 7.

The potentiometer circuit may be traced from a battery 19, through an ammeter 150, to one side of a reversing switch 17; then through a rheostat 12, the rheostat 13, and the resistor coils 14, to the other side of the reversing switch 17; and then through a fixed resistor 20, back to the battery 19. By means of the ammeter 150 and the rheostat 12, the current in the potentiometer circuit is adjusted to such a value that the drop across each of the three resistor coils 14 is one millivolt, as before described. Depressing a leaf A of the right-hand switch 21 downward, as viewed in Fig. 2, to make contact with a member B, and to break contact with the member C, will result in connecting the terminals of the string galvanometer across one coil section of the resistor 14. An electromotive force of 1 millivolt will thus be connected across the string member 15. Depressing the corresponding leaf A of the next-adjacent switch 21 will result in a corresponding connection across the string member 15 of 2 millivolts, and the left-hand switch 21 similarly controls an electromotive force across the string member 15 of 3 millivolts. With these known electromotive forces applied to the string member 15, its tension is adjusted until the deflection of the string image at the recording camera is one centimeter.

The rheostat 13 is used to obtain an electromotive force of from 0 to 70 millivolts, whose polarity may be controlled by the switch 17, this electromotive force being adjusted in value so as to be equal and opposite to that of, and thus to balance out, or annul, the "skin-currents" and thus to eliminate them from the measurements. The rheostat 23 with contact member 25 is used to shunt the galvanometer connections 26 and 4 when making adjustments to protect the galvanometer against excessive voltages. When all adjustments are completed, the shunt is open circuited, as shown by the contact member 25, giving full galvanometer sensitivity.

The switch 18 is a transfer switch serving to connect the galvanometer either across a resistor 28, the resistance of which approximates in value the average patient's body resistance, or across the various connections to the patient's body previously mentioned.

For compactness, the apparatus is carried by a single base or support, shown in Fig. 1 as a table. The lamp 2, the galvanometer 10, the resistance box 7, the time marker 78, the motor 96 and the camera 74 are supported on the top of the table. A transformer 116, and a rectifier 118, with its filters and other apparatus, and also the motor 96, are supported on a lower shelf of the table.

According to the present invention, the lamp 2, the motors 95 and 96, which may be of the synchronous type, and the electromagnet coils 11 of the galvanometer 10 are all energized from a common source of alternating-current energy, as the alternating-current mains. This does away with the necessity for carrying heavy apparatus from place to place when the instrument is transported, as all that is necessary is to connect the apparatus to any ordinary alternating-current circuit. The connections are as follows: Power is taken from the mains, through leads 106, to a metal, distributing, box enclosure 108, containing a switch 115, which connects the leads 106 to two high-voltage, power lines 112 and 113. The line 112 supplies alternating current direct to the camera motor 96. The line 113 is connected with the primary winding 117 of the transformer 116. One of the secondary windings 119, shunted by a capacity 127, is in circuit with the rectifier 118 and a choke coil 129. The rectifier 118 supplies rectified or direct current to the windings 11 of the galvanometer 10, being connected therewith by conductors 120. The rectifier 118 may be of any suitable type, such as a copper-oxide rectifier, provided with appropriate filters and having the proper combination of capacitance and inductance to remove alternating-current ripples.

Another secondary winding 114 of the transformer 116 supplies current at reduced voltage to the lamp 2 and the time-marker motor 95; the former by way of conductors 121, in series with a regulating resistance 123, for adjusting the voltage on the lamp 2, and the latter by way of conductors 110.

The instrument is so sensitive that the circuit taking current from the patient, and which is entirely unrelated to the power circuit that supplies energy to the windings 11, the lamp 2 and the camera motor 96, is found to be susceptible to the pick up of stray, alternating-current fields. It has heretofore been considered, indeed, that so sensitive an instrument can not be operated in proximity to an alternating-current line, so that the power circuit has heretofore been energized entirely from storage batteries. In accordance with the present invention, however, suitably designed shields are provided for the galvanometer, the field-magnet windings 11, and for the wiring, which shields are found to protect the instrument fully in this particular. The shields consist of metal boxes, tubes and braided metal covers on cables, covering the wiring, all connected or tied together as one system and grounded by a common earth-connecting ground wire 130 to a braided metal sheath or shield 126 for the power leads 106, grounded by a grounding wire 128. The sheath 126 and also the other shields or sheaths are illustrated in Fig. 2 by dotted lines. The switch 115 is protected by the metal box enclosure 108. The resistance box 7 that encloses the control circuit, for example, has a sheet-metal cover that is grounded to the sheath 126 by means of the conductor 130. The transformer 116 and the rectifier 118, with its filters, are housed in a steel, shielded box 132, likewise connected with the grounded conductor 130, as illustrated. The wiring for the lamp 2, the time-marker 78 and the galvanometer coils 11 are enclosed in a shielding metal base 134 that is similarly connected with the grounded conductor 130. From this base 134, the leads 121 and 110 are enclosed by flexible metal conduits 152 and 154. The wires 120 are enclosed in a similar sheath 156. The braided metal sheath 9, attached to the control box 7, as illustrated in Fig. 1, protects the patient leads 6, 8 and 29 from stray fields. In this manner, the pick-up of stray fields by the various units is prevented and any static charges developed are readily drained off.

The entire power system is entirely separated from the sensitive system in the circuit-control box 7 with the exception of the galvanometer string member 15.

If the frequency supplied by the alternating-current power mains is not maintained constant by suitable regulation, the speed of the time-marker motor 95 will not be accurately timed. The tuning fork 158, of suitable frequency, may then be employed to correct the timing of the motor speed. The direct current for driving the tuning fork may be obtained by connecting it to the rectifier lines 120, and this direct current is commutated by the tuning fork to produce an interrupted direct current of known frequency, which then serves to drive the synchronous motor 95.

Referring to Fig. 3, direct current is taken from the rectifier 118, connecting at line 120, through a line 165, to the tuning fork 158 mounted on a metal base 155, enclosed in a shield box 157. One side of the line 165 is grounded at 166 to the fork base 155. The other side of the line 165 is connected through the fork driving magnet 159 to a contact member 162, which is adjusted to contact with one bar of the fork as it vibrates, thus setting up an intermittent current in the coil 159 sufficient to keep the fork in vibration. The other bar of the fork contacts alternately with contact members 160 and 161, thus connecting these points alternately with one side of the rectifier through the ground connection 166 on the base 155. This rectifier pole is thus connected in turn to the ends of the oppositely wound, synchronous motor coils 164 and 163 and circuit is completed to the other rectifier pole through the common coil connection 167. The current from the rectifier being alternately applied to the opposed coils 163 and 164, an alternating field is set up in the synchronous motor 95 of the same frequency as the tuning fork. The motor speed is thus controlled at the frequency of the fork.

Modifications will occur to persons skilled in the art, and all such are considered to fall within the spirit and scope of the invention, as defined in the appended claims.

What is claimed is:

1. In an electrocardiograph having a source of light, a galvanometer having an energizing winding and a sensitive element controlled thereby, a recording camera, a motor for feeding sensitized material in the camera, and means for directing light from the source past the sensitive element to the sensitized material, a rectifier connected with the galvanometer winding, a power circuit connected with a source of alternating current and with which the light source, the motor and the rectifier are connected, a sensitive circuit independent of the power circuit and with which the sensitive element is connected, means for connecting a patient with the sensitive circuit, and means for shielding the sensitive circuit from the power circuit.

2. In an electrocardiograph having a source of light, a string galvanometer having an electromagnet provided with opposed slightly spaced pole pieces, energizing windings therefor, and an electroconductive string member disposed between the pole pieces, a recording camera, a motor for feeding sensitized material in the camera, and means for directing light from the source past the string member to the sensitized material, a rectifier connected with the galvanometer windings, a power circuit connected with a source of alternating current and with which the light source, the motor and the rectifier are connected, a sensitive circuit independent of the power circuit and with which the string member is connected, means for connecting a patient with the sensitive circuit, and means for shielding the sensitive circuit from the power circuit.

3. In an electrocardiograph having a source of light, a string galvanometer having an electromagnet provided with opposed slightly spaced pole pieces, energizing windings therefor, and an electroconductive string member disposed between the pole pieces, a recording camera, a motor for feeding sensitized material in the camera, and means for directing light from the source past the string member to the sensitized material, a rectifier connected with the galvanometer windings, a power circuit connected with a source of alternating current and with which the light source, the motor and the rectifier are connected, a sensitive circuit independent of the power circuit and with which the string member is connected, a standardizing circuit, means for connecting the standardiing circuit with and for disconnecting it from the string member, means for connecting a patient with the sensitive circuit, and means for shielding the sensitive circuit from the power circuit.

4. In an electrocardiograph having a source of light, a string galvanometer having an electromagnet provided with opposed slightly spaced pole pieces, energizing windings therefor, and an electroconductive string member disposed between the pole pieces, a recording camera, a motor for feeding sensitized material in the camera, and means for directing light from the source past the string member to the sensitized material, a rectifier connected with the galvanometer windings, a power circuit connected with a source of alternating current and with which the light source, the motor and the rectifier are connected, a sensitive circuit independent of the power circuit and with which the string member is connected, a standardizing circuit for connecting the standardizing circuit with and for disconnecting it from the string member, means for connecting a patient with the sensitive circuit, means for compensating for the patient's skin currents connected with the sensitive circuit, and means for shielding the sensitive circuit from the power circuit and for shielding the galvanometer windings, the light source, the patient-connecting means and the rectifier.

5. In an electrocardiograph having a source of light, a string galvanometer having an electromagnet provided with opposed slightly spaced pole pieces, energizing windings therefor, and an electroconductive string member disposed between the pole pieces, a recording camera, a motor for feeding sensitized material in the camera, a time marker, a motor for the time marker, and means for directing light from the source past the string member and the time marker to the sensitized material, a transformer, means for connecting the camera motor and the transformer with a source of alternating current, a rectifier and filters therefor connected with the transformer, means connecting the galvanometer windings with the rectifier and the filters, means connecting the light source and the time-marker motor with the transformer, means for connecting a patient in circuit with the string member, and means for shielding the windings, the light source, the transformer, the patient-connecting means, the rectifier and the filters.

6. In an electrocardiograph having a source of light, a galvanometer having an energizing winding and a sensitive element controlled thereby, a recording camera, a motor for feeding sensitized material in the camera, a time marker, a motor for the time marker, means for controlling the speed of the time marker motor, and means for directing light from the source past the sensitive element and the time marker to the sensitized material, a rectifier connected with the galvanometer winding and the speed-controlling means, a power circuit connected with a source of alternating current and with which the light source, the camera motor and the rectifier are connected, a sensitive circuit independent of the power circuit and with which the sensitive element is connected, means for connecting a patient with the sensitive circuit, and means for shielding the sensitive circuit from the power circuit.

In testimony whereof, I have hereunto subscribed my name.

RALPH H. KRUSE.

CERTIFICATE OF CORRECTION.

Patent No. 1,882,402.  October 11, 1932.

RALPH HENRY KRUSE.

It is hereby certified that error appears in the printed specification of the above numbered patent requiring correction as follows: Page 5, line 33, claim 3, for "standardiing" read standardizing; and line 55, claim 4, after "circuit" insert , means; and that the said Letters Patent should be read with these corrections therein that the same may conform to the record of the case in the Patent Office.

Signed and sealed this 14th day of November, A. D. 1933.

(Seal)

F. M. Hopkins
Acting Commissioner of Patents.